Figure 1:
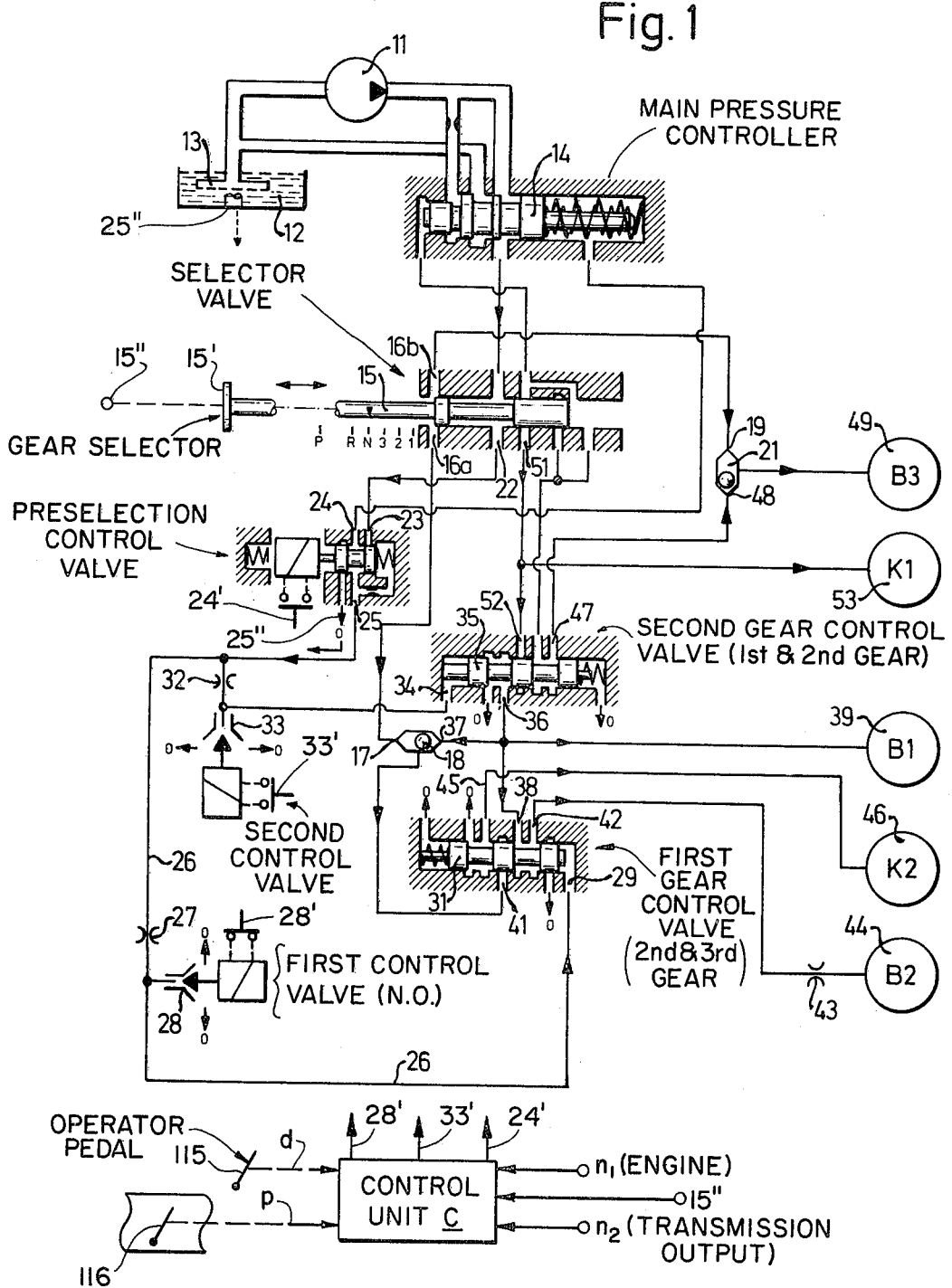

United States Patent [19]
Will

[11] 3,937,108
[45] Feb. 10, 1976

[54] ELECTRONIC AND HYDRAULIC CONTROL SYSTEM FOR AUTOMOTIVE, AUTOMATIC GEAR CHANGE TRANSMISSIONS

[75] Inventor: Gerhard Will, Beutelsbach, Germany

[73] Assignee: Robert Bosch G.m.b.H., Gerlingen-Schillerhohe, Germany

[22] Filed: Oct. 21, 1974

[21] Appl. No.: 516,662

[30] Foreign Application Priority Data
Oct. 23, 1973  Germany............................ 2352939

[52] U.S. Cl. ...................... 74/866; 74/869; 74/864; 74/645
[51] Int. Cl.[2]......................................... B60K 41/18
[58] Field of Search ............. 74/861, 862, 863, 864, 74/865, 866, 867, 868, 869, 645

[56] References Cited
UNITED STATES PATENTS

| | | | |
|---|---|---|---|
| 3,650,161 | 3/1972 | Ito et al. ................................ | 74/866 |
| 3,665,779 | 5/1972 | Mori ...................................... | 74/866 |
| 3,750,495 | 8/1973 | Ito et al. ............................... | 74/866 |

*Primary Examiner*—Samuel Scott
*Assistant Examiner*—Lance W. Chandler
*Attorney, Agent, or Firm*—Flynn and Frishauf

[57] ABSTRACT

To permit continued operation of an electronically controlled gear change transmission in case of failure of electronic control signals, at least one three-way check valve is included in the system to connect, in one mode of operation, the normal output control signals from a hydraulic control valve system to engage an operating element (such as a control clutch, control band, or the like in the automatic transmission) and, when in another position, connect hydraulic pressure to effect connection of drive power to the first gear, or reverse (as selected by a control selector) and in the absence of electrical command signals from the electronic control unit. By use of a second three-way check valve, simple interlocks to prevent shifting into reverse when the vehicle is moving forward in excess of a given speed, and to permit holding of an engaged gear in case of malfunction, can be provided.

10 Claims, 2 Drawing Figures

ELECTRONIC AND HYDRAULIC CONTROL SYSTEM FOR AUTOMOTIVE, AUTOMATIC GEAR CHANGE TRANSMISSIONS

Cross reference to related applications:
U.S. Ser. No. 299,516, filed Oct. 20, 1972 now U.S. Pat. No. 3,835,733
U.S. Ser. No. 405,101, filed Oct. 10, 1973 now U.S. Pat. No. 3,851,285
U.S. Ser. No. 464,809, filed Apr. 29, 1974
U.S. Ser. No. 288,654, now U.S. Pat. No. 3,785,224
U.S. Ser. No. 446,140, filed Feb. 27, 1974,
assigned to the assignee of the present invention.

The present invention relates to a control system for automotive, automatic gear change transmissions, and more particularly to such a system having three forward gears and a reverse gear, that is, having the normal gear selector positions: park (P), reverse (R), neutral (N) and third, second and first gears (3, 2, 1), and especially to such a system which is controlled by an electronic control system which, by means of electrically controlled valves, controls a hydraulic operating system.

Various types of automatic transmissions for automotive use include a planetary gearing in which the respective units of the planet gear are hydraulically engaged, or braked in order to connect selected gear transmission ranges between the engine and the drive wheels. For example, either the sun gear or the planet gears, or the circumferential gears are selectively driven from the engine, or braked. Gear change is effected by selection and braking of a selected portion of the planetary gear drive. Gear change, that is, from one transmission ratio to another, should be as smooth as possible, and without shocks, or noticeable jerks in drive in order to achieve a smooth and comfortable ride. The clutches and brakes used in the automatic gear are subject to wear, and wear on the clutches and brakes should be limited.

Increasingly, automatic gear change transmissions are controlled by electronic control units. These electronic control units must operate reliably; it is still, however, possible that a cable may break, or that the entire electronic control unit fails; such failure, if it occurs while the vehicle is operating, may be dangerous and the arrangement should be such that the vehicle, and the passengers therein, are not endangered by malfunction of the electronic control system. Further, the system should be so arranged that even it the control unit should fail, at least one of the gear transmission ranges should be connectable to the engine in order to permit driving the vehicle to a service or repair station.

It is highly desirable that an interlock is provided so that the operator cannot engage a low gear or, even worse, reverse gear if the vehicle is moving at relatively high speed. Many automatic transmissions do not provide for such safety interlocks, or do so only to a limited extent.

It is an object of the present invention to provide a hydraulic control system for automatic gear change transmissions which has the additional safety features above referred to, which is reliable, and simple, and in which the change required to introduce the additional safety feature does not require an entirely new design or construction of the hydraulic control system or of known gear change transmissions.

Subject matter of the present invention: Briefly, the hydraulic control system for automatic gear change transmissions for automotive use utilizes a hydraulic pressure supply and electrically controlled valves, selectively energized by an electrical control unit to which operating parameters of the engine and of the vehicle are introduced to command the proper gear ratio. The gear ratio itself is selected by hydraulic gear control valves to which hydraulic pressure fluid is applied. In accordance with the present invention, a three-way check valve is provided which has one input connected to an output of a selector valve which provides fluid pressure when a specific gear selection, as manually determined, is selected. A second input of the check valve is connected to an output of the gear control valve which normally commands the vehicle to operate in second or third gear. The output of the check valve (which selectively connects either one of the inputs to the output) is connected to a control input of a gear control valve which commands the vehicle to operate either in first, or reverse gear (depending upon the setting of the manual gear selector). The check valve thereby provides passage through its output from a selected input to the gear control valve either under control of the automatic system, that is, from the normal gear control valve, when the system is operating normally, or, additionally, however, it provides output to that gear control valve which commands either first gear, or reverse gear (depending selector position) even if the electrical or electronic control unit is disabled, and thus does not provide fluid pressure at the second input, that is, the input connected to this specific control unit.

The system commands the gear transmission to cause the vehicle to operate in a predetermined gear ratio - as set by the gear selector (preferably, and in accordance with a feature of the invention, first gear or reverse) even if the electronic control units fails partially, or totally. If the gear engaged by the hydraulic system was the first gear when the electronic control unit failed, then this gear will remain connected. If the transmission was in second or third gear, then the third gear will be enabled. This prevents excessive speed of the engine even if, at the time of failure of the electronic system, the vehicle operates at high speed.

In accordance with a feature of the invention, an additional three-way check valve is provided which is so connected, hydraulically, that engagement of the reverse gear is prevented if high vehicle speed is sensed (as provided by an electrical sensor connected to the control unit, for example) thereby avoiding damage to the transmission if the driver should change the manual gear selector to reverse while the vehicle is operating forwardly at a speed in excess of a predetermined limit.

Figure 2:
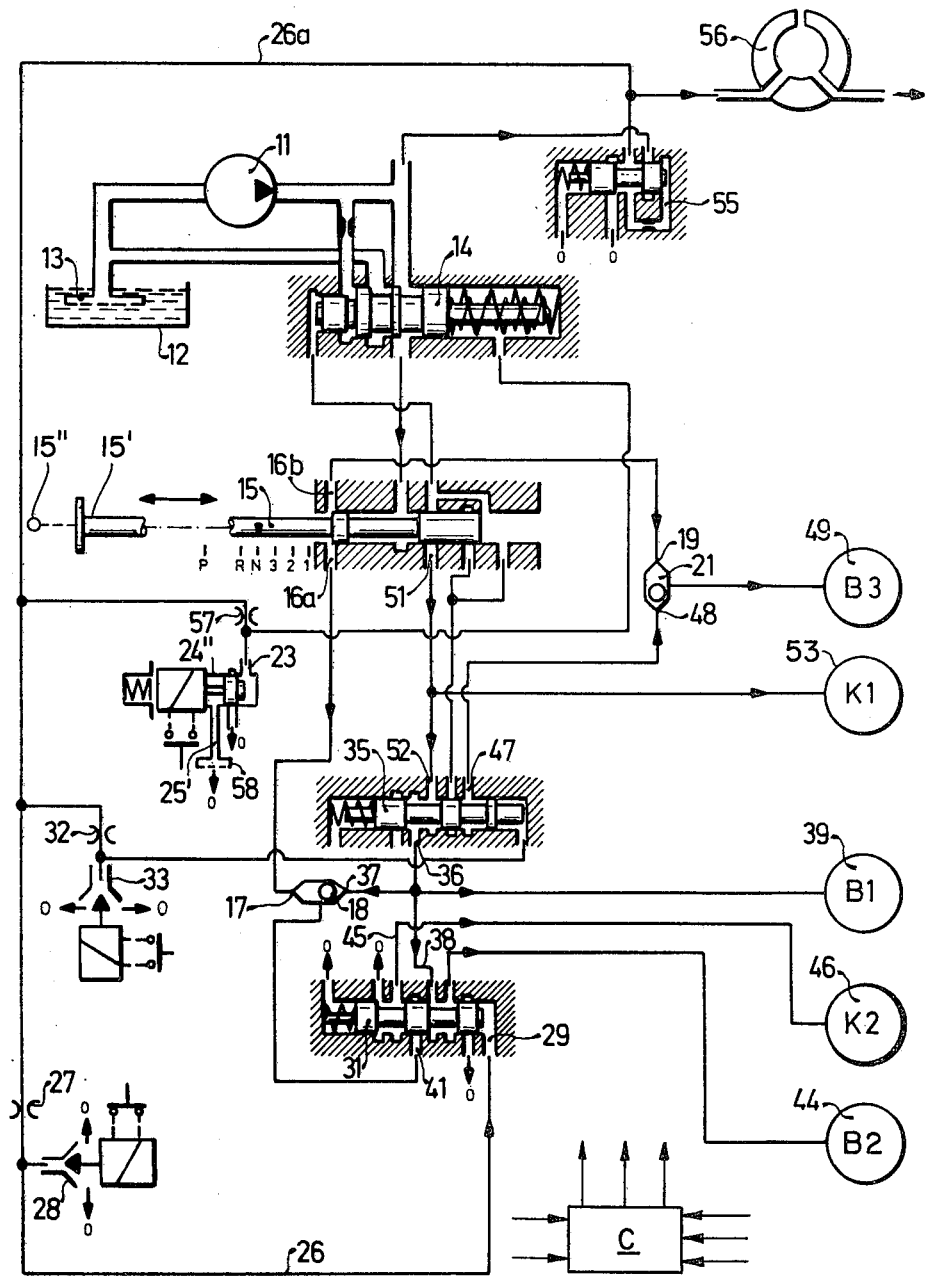

The invention will be described by way of example with reference to the accompanying drawings, wherein:

FIG. 1 is a highly schematic hydraulic and electrical diagram of the gear change system in accordance with the present invention, in which the gearing and the engine itself have been omitted; only so much of the control system is shown as is necessary to an understanding of the present invention; and FIG. 2 is a diagram similar to FIG. 1, and showing another embodiment, in which the same elements have been given the same reference numerals.

The elements used in the system of the present invention (see FIG. 1) generally all are known. The arrangement of the system need be described only in general terms, therefore. All unessential material has been omitted in order to clarify and highlight the inventive concept.

A pump 11 (FIG. 1) supplies hydraulic fluid under pressure from a sump 12. The suction line is connected to the pump 11 through a filter screen 13. A main pressure regulator 14 is connected to the output line of the pump 11, in known manner. The main pressure regulator provides hydraulic fluid under pressure to a selector valve 15. The selector valve 15 is a spool valve and is operated manually by a gear selector 15′. The position of the gear selector 15′ is additionally sensed electrically and provides an electrical control signal at a terminal, or terminal board 15″. The terminal, or terminal board 15″ is connected to the electrical control unit C, and has a signal, or a group of signals appear thereat which are representative of the position of the manual gear selector 15′. The manual selection permits placing the vehicle gear in any one of the positions P, R, N, 3, 2, 1.

The selector valve 15 has a first output port 16a which is connected to a first input 17 of a first three-way check valve 18. A second port 16b, and having the same hydraulic connection as the first output 16a, connects the first output of the selector valve 15 to the first input 19 of a second three-way check valve 21. The lines which are connected to the first output 16 (having ports 16a, 16b) receive pressure only if the manual gear selector 15′ is in the "reverse" (R) position. A preselection control valve 24 has its input 23 connected to a second output 22 of the selector valve 15. As can be seen, the input 23 is so connected to the selector valve that the preselection control valve 24 receives pressurized fluid from the selector valve in all positions of the gear selector 15′. The output 25 of the preselection control valve is connected to a first line 26, in which a hydraulic choke 27 is located. A first electrically operated control valve 28, which is normally open, is connected downstream from the choke 27 to drain pressurized fluid therefrom, unless energized. The line 26 continues to the first input 29 of a first gear control valve 31. The first gear control valve 31 controls the respective brake and clutch bands of the gear transmission to set the transmission either in second or third gear. A spring S keeps valve 31, unless pressurized from line 26, in a rest position. The output 25 of the preselection control valve 24 is additionally connected over a second hydraulic choke 32 to a second control valve 33 and to the first input 34 of a second gear control valve 35. The second gear control valve commands second, or first gear of the transmission.

Both the first control valve 28 as well as the second control valve 33 are ON-OFF valves. The first output 36 of the second gear control valve 35 is connected to the second input 37 of the first three-way check valve 18. The first output 36 of the second gear control valve 35 is further connected to a third input 38 of the first gear control valve 31 and, additionally, to the input of a B1 first brake 39. The output of the first three-way check valve 18 is connected to a second input 41 of the first gear control valve 31. The first output 42 of the first gear control valve 31 is connected over a third hydraulic choke 43 to the input of a B2 second brake 44. The input of a second clutch 46 is connected to a second output 45 of the first gear control valve 31. The second input 48 of the second three-way check valve 21 is connected to a second output 47 of the second gear control valve 35. A third B3 brake 49 is connected to the output of the second three-way check valve 21.

The selector valve 15 has a second output 51, which is connected to a first input 52 of the second gear control valve 35, and to the input of a first K1 clutch 53, by a common junction. The first and second control valves, each, are connected from the preselection control valve through a hydraulic choke. These valves only require a single control edge and the control path thereof is either opened, or closed. It is equally possible to use valves having two control edges which operate without the respective chokes 27, 32 and which can open and close a control chamber when operating in either direction.

Operation of the system with reference to FIG. 1 and to Table 1: In Table 1, the first column lists the gear ratio commanded by the control unit C; the second column shows the energization state of the first control valve 28, the third column shows the energization state of the second control valve 33, the fourth column shows which clutch is supplied with pressurized hydraulic fluid and the fifth column which brake is supplied with pressurized hydraulic fluid. The notation 1 and 0 is that used in digital controls technology, that is, the "1" signal indicates that the respective valve is energized and the "0" signal that the respective valve is de-energized.

Control current to the valves 24, 28, 33 is supplied from a control unit C through suitable lines 24′, 28′, 33′, respectively. The control unit is connected to various sensors associated with the engine, or the automotive vehicle, and the transmission of the vehicle, respectively. Only some of those sensors, which sense varoious operating parameters, are shown. An operator pedal 115 provides a deflection, the extent of which is sensed as a deflection input signal $d$; a mass air flow meter 116, for example a spring-loaded flap in the induction pipe to the engine, provides a pressure, or flow signal $p$ to the control unit C. Two speed signals are provided, one being the output speed $n_1$ of the engine, and the other being the output of the transmission $n_2$. An additional signal is being applied to the control unit from terminal (or terminal strip) 15″, representing the position of the gear selection lever 15′, as set by the operator of the vehicle. Not all of these signals are necessary; for example, either one of the operator pedal displacement signals $d$ or of the flow signals $p$ may be omitted; either one of the engine speed or transmission output speed signals may be omitted — preferably the engine speed output signal. Additional sensing signals may be supplied to the control unit C, and reflecting other operating parameters of the engine, for example to prevent overloading or excessive speed of the engine when it is cold.

The first four rows of Table 1 indicate the gear change positions for the respective gear connected by the transmission. The fifth line, indicated as "R blocked" shows the position of the control valves and the respective brakes and clutches if the operator should place the gear selection lever 15′ in "reverse" (R) although the vehicle has a forward speed in excess of a predetermined value, for example about 15 km/h (about 9 mph).

The first three-way check valve 18 is controlled as follows: The first input 17 thereof has pressure when the selector valve 15 is in the R position; when the transmission has commanded second or third gear (first gear control valve 31 moved to operated position), the second input 37 has pressure applied. The first gear control valve is so controlled by the first electrically operated control valve 28 that it is in operated position for third gear when the coil of the valve 28 is de-energized, that is, does not have current flow therethrough.

The second three-way check valve 21 is pressurized as follows: The first input 19 is pressurized when the selector valve 15 is in the position R. The second input 48 is pressurized when the transmission has connected the first gear transmission range and when the selector 15 is in position commanding gear 1 or gear 2.

If the entire electronic control unit C (or its power supply, or cable connections) should fail, then the second gear control valve 35, associated with first and second gear range, will switch into the position commanding the first gear. This would connect the vehicle engine to the first gear range. Torque is transmitted in the first gear only in one direction, however, that is, from engine to wheels, and not in the reverse. Thus, the engine is not overstressed and rotated at excessive speed even if the vehicle should move at high speed, for example at 150 km/h (about 90 mph). The second K2 clutch 46, commanding reverse R, can be energized with hydraulic pressure fluid only if the first control valve 28 is not energized. Thus, even if the operator should change the gear selector 15' to reverse (R), the respective K2 clutch is not energized because the control unit C, sensing engine parameters (forward speed and throttle position) would command valve 28 to close, thus energizing the first gear control valve 31, which is held in the position by flow through the three-way check valve from the first input 17 through the output thereof and into the second input 41. The first three-way check valve 18 has an additional function. If the control unit C is completely disabled, for example upon disruption of energization, breakage of all cables, or the like, it is still possible to operate the vehicle in first gear, or in reverse. The two gears 1 and R can be commanded directly by suitable positioning of the selector valve 15, upon operation of the gear selector 15'.

The clutches (generally denoted K) and brakes (generally denoted B) are enabled, or energized, as shown in columns 4 and 5 of Table 1: in third gear, first K1 clutch 53 and second K2 clutch 46. Torque is directly transmitted from the engine through the transmission. The first K1 clutch 53 is energized in all forward gear ranges. It is controlled be the selector valve 15. The second K2 clutch 46 is selectively connected, either if (a) the selector valve 15 is in the R position; or (b) the transmission is in third gear range. The first brake 39 is energized when the transmission is in second gear range, and also energized when the transmission is in third gear range. The second B2 brake 44 is energized only when the transmission is in second gear range. Energization of the third brake 49 is enabled, as above referred to, when the gear selector valve is in R position; when the gear selector valve is in 1 position, then the third B3 brake may be energized only when the second control valve 33 is energized, that is, has a 1-signal applied. This permits use of the engine for engine braking for example when moving downhill.

Referring now to FIG. 2, in which like parts, and operating similarly, have been given the same reference numerals and will not be explained again; only the differences between the embodiments of FIGS. 1 and 2 will be explained in detail. A torque converter pressure valve 55 is connected to the pump 11 and to the main pressure controller 14. A torque converter 56 is connected to the torque converter pressure control valve 55; the output of the torque converter is connected to lubricating points, not shown. The output of the torque converter valve is connected to a portion 26a of line 26, which is the portion in advance of the first hydraulic choke 27. The first portion 26a is further connected over a fourth choke 57 to the input of the preselection control valve 24''. The output 25 of the preselection control valve 24'' is terminated in a filter screen 58. This screen is preferably so located that it terminates in the sump 12 beneath the screen 13 of the pump 11 and the main pressure controller 14. A single control edge-type valve is used for the preselection control valve 24''.

Operation, with reference to Table 2: The second gear control valve 35 is so controlled by the second electrical control valve 33 that the first gear is commanded whenever current flows from the electronic control unit C to energize the second control valve 33. Thus, even if the operator misuses the gear selector slider 15' to command the selector valve to first gear range at high speed, and simultaneous failure of the electronic control unit, the engine still cannot be brought to an excessive speed. Use of the torque converter valve 55 with constant pressure has additional advantages: supply is simplified, and the electromagnetically controlled valve, as well as the preselection control valve can be more easily standardized. Use of a single-edged preselection valve decreases the losses in hydraulic fluid since the supply pressure is constant, and the requirements placed on the valve for linearity of operation likewise is decreased.

The use of single-edged valves, and particularly of a single-edged valve 24'' for the preselection control valve has the advantage with respect to the double-edged valve that the diameter of the spool can be made smaller, and that the manufacture is simplified. A preselection valve which is of the spool type has the advantage with respect to a single-edged valve seat-type valve that the valve does not impinge on the seat upon closure, and when pressure oscillations result; changes in average pressure are thereby avoided.

The screen 58 in the drain line from the preselection control valve, or the location of the drain outlet beneath the screen 13 of the pump has the advantage that contamination of the magnet which operates the valve, by dirt, or the like, is essentially avoided.

The first and second control valves, in accordance with a feature of the invention, are operated from a pressure line, line 26 and line 26a, respectively, which is at the same pressure as that of the preselection control valve 24, 24'', respectively. This pressure is less than the main operating pressure, and is not increased additionally when the vehicle is in reverse. This permits construction of the valves 28, 33, in smaller size, and hence with lesser manufacturing costs.

Various changes and modifications may be made, and features described in connection with one embodiment will be used with the other, within the scope of the inventive concept.

TABLE 1

| (1) Gear ratio | (2) Second Control Valve 33 | (3) First Control Valve 28 | (4) Clutch K | (5) Brake B |
|---|---|---|---|---|
| 1 | 0 | 0 | K1 (53) | |
| 2 | 1 | 1 | K1(53) | B1(39) B2(44) |

TABLE 1-continued

| (1) Gear ratio | (2) Second Control Valve 33 | (3) First Control Valve 28 | (4) Clutch K | (5) Brake B |
|---|---|---|---|---|
| 3 | 1 | 0 | K1(53) K2(46) | B1(39) |
| R | 0 | 0 | K2(46) | B3(49) |
| R blocked | 0 | 1 | — | — |

TABLE 2

| (1) Gear ratio | (2) First Control Valve 28 | (3) Second Control Valve 33 | (4) Clutch | (5) Brake |
|---|---|---|---|---|
| 1 | 1 | 1 | K1(53) | — |
| 2 | 0 | 1 | K1(53) | B1(39) and B2(44) |
| 3 | 0 | 0 | K1(53) | B1(39) |
| R | 0 | 0 | K2(46) | B3(49) |
| R blocked | 0 | 1 | — | B3(49) |
| 1, and selector 15 in "1" range | | 1 | K1(53) | B3(49) |

I claim:

1. Hydraulic control system for an automotive automatic gear change transmission having three forward gear ranges (1, 2, 3) and a reverse (R) range, and a system of clutch (46, 53) and brake (39, 44, 49) means to control selective engagement of the gears of the transmission comprising a pressure pump (11) and a pressure regulator means (14) to supply pressurized hydraulic fluid under predetermined pressure to operate the clutch and brake means;

a manual selector means (15') and a selector valve (15) controlled thereby to command a predetermined gear range position;

a control unit (C) having input signals applied thereto representative of engine and vehicle operating parameters and providing output signals to select the proper gears for operation of the vehicle as determined by said engine vehicle operation parameters;

a first gear control valve (31) having first and second inputs (29, 41) controlling engagement of the respective clutch and brake means of the second and third gear ranges and normally in a position to connect hydraulic pressure fluid to the respective clutch and brake means commanding the transmission to be in third gear;

a second gear control valve (35) controlling engagement of the respective clutch and brake means of the first and second gear range;

a pressure line (26, 26a) in fluid communication with said pump (11) and pressure regulator (14) and including a hydraulic choke (27);

a first control valve (28) connected to and controlled by said control unit (C) and hydraulically connected in said pressure line (26) between the choke (27) and the first input (29) of the first gear control valve (31);

the first control valve (28) being normally open to bleed pressure fluid from said line whereby the first gear control valve (31) will command engagement of the third gear and, upon energization from the control unit (C) upon sensing that the operation parameters require the second gear, said first control valve (28) being energized to thereby prevent bleeding of pressurized fluid and cause changeover of said first gear control valve (31);

said system being characterized by a three-way check valve (18) having a first input (17) connected to an output (16) of the selector valve (15) and a second input (37) connected to an output (36) of the second gear control valve (35) and having its output connected to the second control input (41) of the first gear control valve (31), said check valve thereby providing pressure through its output to the first gear control valve (31) under control of the second gear control valve (37) for operation under normal operating conditions and additionally providing output to the first gear control valve (31) and manual selection of the selector means (15') operating said selector valve (15) even if said control unit (C) is disabled and does not provide operating signals to said control valve (28).

2. System according to claim 1, wherein (FIG. 1) a preselection control valve (24) is provided, said pressure line (26) being connected to the output (25) of the preselection control valve (24).

3. System according to claim 1, wherein the control unit (C) includes an input representative of transmission output speed ($n2$);

and said control unit (C) provides an output signal connected to said first control valve (28) to energize said first control valve and close said control valve if said sensed output speed ($n2$) exceeds a predetermined limit, and said first control valve (28) is retained in said energized state even if said gear selector (15') is moved to move the selector valve (15) into reverse gear range.

4. System according to claim 1, further comprising a second control valve (33) connected to said pressure line (26) at a position upstream from said hydraulic choke (27).

5. System according to claim 4, wherein the first and second control valves (28, 33) are energized, with respect to the gears engaged by the transmission, as set forth in Table 1.

6. System according to claim 4, wherein the second control valve (33) is hydraulically so connected to the second gear control valve (35) that the transmission will connect the first gear range upon energization of the winding of the second control valve (33).

7. System according to claim 1, wherein (FIG. 2) a torque converter valve (55) is provided, and the pressure line (26a) is connected to said torque converter valve (55).

8. System according to claim 1, wherein (FIG. 2) a preselection control valve (24) is provided, said preselection control valve being a single control edge spool valve.

9. System according to claim 1, wherein (FIG. 2) a preselection control valve (24") is provided, said valve having a drain connection (25'), and a filter screen (58) closing off the drain terminal.

10. System according to claim 1, wherein (FIG. 1) a preselection control valve (24") is provided, said valve having a drain connection (25");

the pump (11) having a filter screen (13) submerged in a sump (12) and connected to the pump inlet;

the drain connection (25) from the control valve (24") terminating beneath the filter screen (13) of the pump (11). .

\* \* \* \* \*